US012781118B2

(12) United States Patent
Wilson et al.

(10) Patent No.: US 12,781,118 B2
(45) Date of Patent: Nov. 3, 2026

(54) MICROMESH PROPPANT WITH A TEMPORARY STRUCTURAL STATE FOR ENHANCED HYDRAULIC FRACTURING

(71) Applicant: Carbo Ceramics, LLC, Houston, TX (US)

(72) Inventors: Brett A. Wilson, Cypress, TX (US); Don Wilson, Perry, GA (US)

(73) Assignee: Carbo Ceramics, LLC

( * ) Notice: Subject to any disclaimer, the term of this patent is extended or adjusted under 35 U.S.C. 154(b) by 0 days.

(21) Appl. No.: 19/044,224

(22) Filed: Feb. 3, 2025

(65) Prior Publication Data

US 2026/0035611 A1 Feb. 5, 2026

Related U.S. Application Data

(60) Provisional application No. 63/549,259, filed on Feb. 2, 2024.

(51) Int. Cl.
*C09K 8/80* (2006.01)
*C09K 8/92* (2006.01)

(52) U.S. Cl.
CPC ................ *C09K 8/805* (2013.01); *C09K 8/92* (2013.01); *C09K 2208/24* (2013.01)

(58) Field of Classification Search
CPC ....... C09K 8/805; C09K 8/92; C09K 2208/24
See application file for complete search history.

(56) References Cited

U.S. PATENT DOCUMENTS

| | | | | |
|---|---|---|---|---|
| 11,597,872 B2 | 3/2023 | Conkle | | |
| 2006/0048943 A1* | 3/2006 | Parker | C09K 8/805 166/308.1 |
| 2006/0113078 A1* | 6/2006 | Nguyen | E21B 43/267 507/924 |
| 2008/0135242 A1* | 6/2008 | Lesko | C09K 8/72 166/280.1 |
| 2019/0106619 A1* | 4/2019 | Nguyen | E21B 21/003 |
| 2023/0203365 A1 | 6/2023 | Conkle | |

* cited by examiner

*Primary Examiner* — Crystal J Lee
(74) *Attorney, Agent, or Firm* — Enrique Sanchez, Jr.; Miguel Hernandez

(57) ABSTRACT

Improved composition and method for a micromesh proppant with a temporary structural state for improved handling and efficiency. The present disclosure provides a micromesh proppant composition configured to transition between a micromesh structural state and an aggregated structural state. The composition includes a plurality of micromesh proppant particles having a particle size from about 150 mesh to about 635 mesh. In the micromesh structural state, the proppant particles are unbounded and free from each other. In the aggregated structural state, the proppant particles are bound into super-particles by a temporary binding agent, with each super-particle comprising two or more proppant particles. The temporary binding agent is configured to break down under predetermined conditions, allowing the composition to transition from the aggregated structural state back to the micromesh structural state.

20 Claims, 10 Drawing Sheets

MICROMESH PROPPANT WITH A TEMPORARY STRUCTURAL STATE FOR ENHANCED HYDRAULIC FRACTURING

CROSS-REFERENCE TO RELATED APPLICATIONS

The present provisional application claims priority to U.S. Provisional App. No. 63/549,259, filed Feb. 2, 2024, hereby incorporated by reference in their its entirety for all purposes.

TECHNICAL FIELD

The present disclosure relates to micromesh proppants for hydraulic fracturing for oil and gas extraction, and more particularly to an improved composition and method for a micromesh proppant with a temporary structural state for improved handling and efficiency.

BACKGROUND

Hydraulic fracturing, commonly known as fracking, is a widely used technique in the oil and gas industry to enhance the extraction of hydrocarbons from underground reservoirs. This process involves injecting high-pressure fluids into a wellbore to create cracks in deep-rock formations, allowing oil and natural gas to flow more freely into the well. A crucial component of this process is the use of proppants, which are solid materials introduced into the fractures to keep them open once the hydraulic pressure is removed.

Traditionally, sand has been the most common proppant material due to its availability and low cost. However, as the industry has advanced, there has been a growing demand for more effective proppant materials, particularly for use in deeper wells and more challenging geological formations. This has led to the development of synthetic proppants, such as ceramic proppants, which offer superior strength and conductivity compared to natural sand.

In recent years, the concept of micromesh proppants has gained attention in the industry. These ultra-fine proppant particles, typically ranging from about 140 mesh to 635 mesh or finer, are designed to penetrate deeper into fracture networks and prop open even the smallest fissures or fractures. This can potentially increase the overall fracture conductivity and enhance hydrocarbon production.

Despite their potential benefits, micromesh proppants present significant challenges in handling, transportation, and deployment. Their small particle size makes micromesh proppants prone to generating dust clouds when they are handled, which can lead to material loss, environmental concerns, and even potential health hazards for workers.

The oil and gas industry continually seeks innovative solutions to improve the efficiency and effectiveness of hydraulic fracturing operations, and has indeed developed new proppant materials, optimized proppant deployment techniques. However, there are currently no viable solutions that can leverage the advantages of synthetic micromesh proppants while addressing the logistical challenges associated with micromesh proppant handling and transportation. As exploration and production activities extend to more challenging reservoirs, the deficiencies of current proppant technologies will be even more pronounced, affecting well productivity.

BRIEF SUMMARY

The present disclosure achieves technical advantages as a proppant composition. The proppant composition of embodiments may include a plurality of micromesh proppant particles having a particle size from about 150 mesh to about 635 mesh. The proppant composition of embodiments may include a micromesh structural state in which the micromesh proppant particles are unbounded to each other and an aggregated structural state in which the micromesh proppant particles are formed into agglomerates or super-particles. Each of these super-particles may represent agglomerates or aggregations of two or more micromesh proppant particles. In this manner, in the micromesh structural state, the micromesh proppant particles may be unbounded from each other, but in the aggregate structural state, the micromesh proppant particles may be bounded from each other in super-particles.

In embodiments, transitioning the proppant composition into the aggregate structural state may include exposing the plurality of micromesh proppant particles to a temporary binding agent configured to form the super-particles from the micromesh proppant particles. In embodiments, the temporary binding agent may be dissolvable or degradable (e.g., under wellbore conditions, when exposed to a breaking agent, etc.) such that upon breaking (e.g., dissolution or degradation of the temporary binding agent), the proppant composition may transition from the aggregate structural state back to the micromesh structural state. In this manner, the proppant composition may be handled safely and efficiently while in the aggregated structural state, minimizing the disadvantages of micromesh proppants during handling, but may be used in the wellbore while in the micromesh particle state, maximizing the advantages of micromesh proppant while in use.

In some embodiments, the binding agent may include water-soluble starches, temperature-sensitive waxes, pH-sensitive polymers, biodegradable polymers, and/or any other material configured to temporarily bind micromesh proppant particles to each other.

In some embodiments, treating a wellbore may include transporting a plurality of bound super-particles (e.g., in the aggregated structural state), each super-particle comprising two or more micromesh proppant particles. In some embodiments, the super-particles may be introduced into a fracturing fluid and may be allowed to disintegrate back into unbounded micromesh proppant particles (e.g., may transition back into the micromesh structural state). The unbounded micromesh proppant particles may be pumped down into the wellbore and propagated into fractures to maintain fracture conductivity. In some embodiments, the super-particles may be configured to disintegrate over a configurable period of time. This configurable period of time may enable the super-particles to disintegrate while they are being pumped down into the wellbore, which may allow an operator to introduce the super-particles into the wellbore in the aggregate structural state, while enabling the super-particles to be disintegrated into the unbounded micromesh proppant particles in the micromesh structural state by the time the proppant particles reach the fracture network.

In some embodiments, the plurality of bound super-particles in the aggregated structural state may be transitioned back into the unbounded micromesh proppant particles of the micromesh structural state before being pumped into the wellbore. For example, the operator may introduce the bound super-particles into the fracturing fluid, which may include water and/or a breaking agent, and/or may expose the super-particles to other breaking-down mechanisms (e.g., temperature, pressure, pH-trigger, mechanical breakage, electrical breakage, etc.), and may allow the super-particles to disintegrate back into unbounded micromesh proppant particles. Once the super-particles have disintegrated back into unbounded micromesh proppant particles, the unbounded micromesh proppant particles may be pumped down into the wellbore and propagated throughout the fracture network.

In some embodiments transitioning the micromesh proppant composition into the aggregated structural state may include providing micromesh proppant particles having an average particle size less than about 100 μm, mixing the micromesh proppant with a binding solution in a pelletizer, and forming super-particles of a size suitable for transport with minimal dust, each super particle including at least two micromesh proppant particles. In some embodiments, transitioning the micromesh proppant composition into the aggregated structural state may include drying or curing the super-particles to ensure mechanical stability for subsequent handling.

It is an object of the disclosure to provide a micromesh proppant composition. It is a further object of the disclosure to provide a method of transitioning a micromesh proppant from a micromesh structural state to an aggregated structural state, and a method of transitioning an aggregated structural state proppant to a micromesh structural state.

In one particular embodiment, a micromesh proppant composition is provided. The micromesh proppant composition includes a plurality of micromesh proppant particles having a particle size from about 150 mesh to about 635 mesh. In embodiments, the proppant composition is configured to transition between a micromesh structural state in which micromesh proppant particles of the plurality of micromesh proppant particles are unbounded and free from each other, and an aggregated structural state in which the plurality of micromesh proppant particles is bound into super-particles, each super-particle comprising two or more of the micromesh proppant particles. In embodiments, the micromesh proppant composition in the aggregated structural state includes a temporary binding agent configured to form the super-particles from the micromesh proppant particles of the plurality of micromesh proppant particles. In embodiments, the temporary binding agent is configured to break down under predetermined conditions, allowing the proppant composition to transition from the aggregated structural state to the micromesh structural state.

In another embodiment, a method of transitioning a micromesh proppant from a micromesh structural state to an aggregated structural state is provided. The method includes providing a plurality of micromesh proppant particles having a particle size from about 150 mesh to about 635 mesh. In embodiments, the micromesh proppant particles are in a micromesh structural state in which the micromesh proppant particles are unbounded and free from each other. The method also includes introducing the plurality of micromesh proppant particles into an aggregation device, adding a temporary binding agent to the aggregation device, and mixing the plurality of micromesh proppant particles with the temporary binding agent in the aggregation device to form a plurality of super-particles. In embodiments, each super-particle includes two or more of the micromesh proppant particles bound together by the temporary binding agent. The method further includes outputting the plurality of super-particles from the aggregation device. In embodiments, the plurality of super-particles is in an aggregated structural state, and the temporary binding agent is configured to break down under predetermined conditions, allowing the plurality of super-particles to transition from the aggregated structural state back to the micromesh structural state.

In yet another embodiment, method of transitioning an aggregated structural state proppant to a micromesh structural state is provided. The method includes providing a micromesh proppant in an aggregated structural state including a plurality of super-particles, each super-particle including two or more micromesh proppant particles bound together by a temporary binding agent, and exposing the micromesh proppant in the aggregated structural state to a breaking mechanism. In embodiments, the breaking mechanism may be configured to break down the temporary binding agent. The method further includes transitioning the micromesh proppant from the aggregated structural state to a micromesh structural state by breaking down the temporary binding agent and disintegrating the plurality of super-particles to unbind the corresponding two or more micromesh proppant particles from each other, and propagating the unbounded micromesh proppant particles into fractures within a wellbore.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
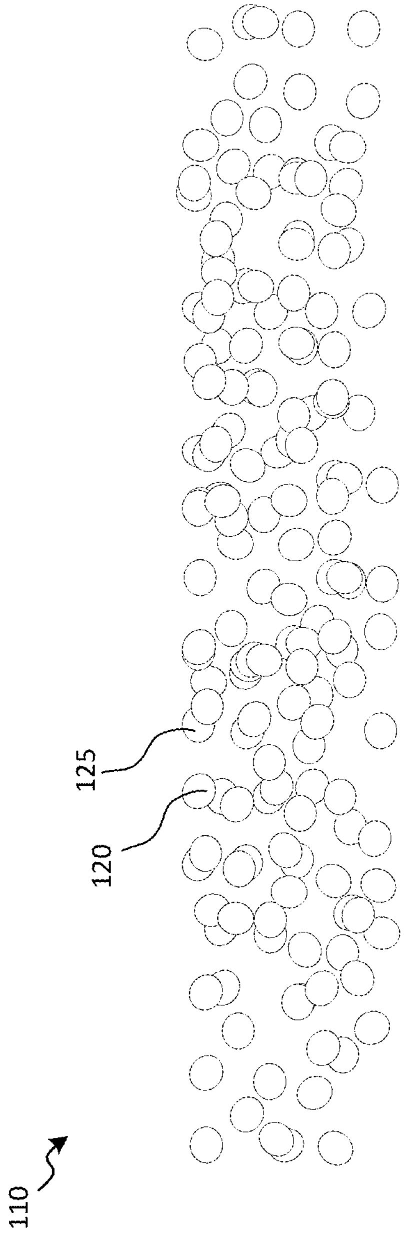
FIG. 1 shows an exemplary micromesh proppant in a micromesh structural state configured in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses, or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features de-scribed herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

Various embodiments of the present disclosure relate to improved proppant compositions and methods for hydraulic fracturing operations in oil and gas extraction. In particular, embodiments of the disclosure provide micromesh proppant particles and processes for temporarily aggregating these particles into larger structures to improve handling, reduce dust generation, improve transportation efficiencies, and increase the safety of handling and transportation operations.

As noted herein, micromesh proppants are ultra-fine ceramic particles configured to penetrate and prop open small fractures and microfractures in wellbores. These proppants may have particle sizes ranging from about 150 mesh to about 635 mesh or even finer. While micromesh proppants offer superior performance in certain aspects of hydraulic fracturing, their small size can present challenges in handling, transportation, and deployment.

To address these challenges, various embodiments of the present disclosure provide proppant compositions that include a plurality of micromesh proppant particles and that include a micromesh structural state in which the micromesh proppant particles are unbounded to each other and an aggregated structural state in which the micromesh proppant particles are formed into agglomerates or super-particles. Various embodiments of the present disclosure provide methods for temporarily aggregating micromesh proppant particles into larger structures (e.g., super-particles or pelletized aggregates) that may be formed using a binding agent that holds the micromesh proppant particles together during transportation and handling. The binding agent may be configured to break down under specific triggering conditions (e.g., exposure to water or moisture, exposure to wellbore temperatures, a predetermined temperature, pH changes or particular pH values, chemical breakers, mechanical breakers, electrical signals, etc.) allowing the proppant to revert to its original fine-particle state once, or to be, deployed in a well.

In embodiments, the aggregated structural state may offer several advantages. For example, the larger super-particles may be easier to handle and transport and may reduce dust generation (and the associated health and environmental concerns) due to the larger size of the super-particles. Additionally, the ability to control the breakdown of the super-particles back into the original micromesh structural state may allow for precise placement of the micromesh proppant particles within the fracture network. For example, this controlled disintegration of the super-particles can be timed to occur at the optimal point in the fracturing process, ensuring that the micromesh proppant reaches its intended location in its most effective structural form.

The methods and compositions described herein may provide a balance between the beneficial and advantageous properties of micromesh proppants and the practical considerations and disadvantages of their use in hydraulic fracturing operations. By addressing key challenges in micromesh proppant handling and deployment, the present disclosure provides methods and compositions that represent a more efficient and effective solution to the challenges of micromesh proppant use in the oil and gas extraction processes.

Furthermore, the advantageous methods and compositions described herein may be applicable in a wider range of hydraulic fracturing applications, including those where dust generation or proppant placement have previously been limiting factors. The configurability of the binding agent may allow for customization of the super-particles (e.g., size, shape, dissolubility, etc.) to suit specific well conditions or operational requirements.

FIG. 1 shows an exemplary micromesh proppant 110 in a micromesh structural state configured in accordance with embodiments of the present disclosure. As shown in FIG. 1, the micromesh proppant 110 may include a plurality of micromesh proppant particles, including proppant particle 120 and a proppant particle 125.

In the example illustrated in FIG. 1, the micromesh proppant 110 represents the proppant composition in the micromesh structural state. In this micromesh structural state, the individual proppant particles are unbounded to each other. For example, as shown, proppant particle 120 and proppant particle 125 are free from each other and not bounded to each other in any way or means, other than being part of the micromesh proppant 110. In this unbounded configuration, the micromesh proppant particles of the micromesh proppant 110 exist as discrete, separate entities within the overall proppant composition.

The micromesh structural state may be characterized by the free movement and independent nature of each proppant particle. In this micromesh structural state, the particles may flow and disperse readily, which may contribute to their ability to penetrate deep into fractures and microfractures within the wellbore. The lack of binding between particles in the micromesh structural state of the micromesh proppant 110 may allow for maximum surface area exposure and optimal placement within the fracture network.

While the micromesh structural state of the micromesh proppant 110 offers advantages in terms of proppant performance downhole, this may also present the aforementioned challenges related to handling and transportation. The fine, unbounded nature of the proppant particles in this state may contribute to dust generation and potential material loss during transfer operations. This micromesh structural state, as illustrated in FIG. 1, operates as the starting point for the aggregation process described in this disclosure, where the proppant particles may be temporarily bound together to form larger super-particles for improved handling characteristics.

In embodiments, the micromesh proppant 110 may include micromesh proppant particles having sizes varying from about 100 mesh to about 700 mesh, such as from about 150 mesh to about 500 mesh, such as from about 175 mesh to about 300 mesh. In some embodiments, micromesh proppant particles of the micromesh proppant 110 may have a size smaller than about 150 mesh, about 160 mesh, about 180 mesh, or about 200 mesh. In some embodiments, the micromesh proppant particles may have a size from about 155 mesh, about 160 mesh, about 175 mesh, about 200 mesh, about 225 mesh to about 250 mesh, about 300 mesh, about 350 mesh, about 400 mesh, about 450 mesh, or about 500 mesh. In embodiments, a micromesh proppant of the present disclosure having micromesh proppant particles of a size ranging from 150 mesh to 500 may provide low settling velocity and propping of microfractures deep within complex fracture networks.

In some embodiments, the mesh size (and opening size) of the micromesh proppant 110 particles may include 100 mesh (or 150 μm), 120 mesh (or 125 μm), 140 mesh (or 106 μm), 170 mesh (or 90 μm), 200 mesh (or 75 μm), 230 mesh (or 63 μm), 270 mesh (or 53 μm), 325 mesh (or 45 μm), 400 mesh (or 38 μm), 450 mesh (or 32 μm), 500 mesh (or 25 μm), and 635 mesh (or 20 μm).

In embodiments, the micromesh proppant 110 may include average proppant particle sizes of less than 150 μm down to about 20 μm. The micromesh proppant 110 may have an angular surface morphology, which may provide increased erosivity beneficial for cleaning or reaming out small orifices in well casings. In some embodiments, the micromesh proppant 110 may have a crush strength at 7,500 psi of about 1% to 20% as measured by API RP60. This crush strength may be sufficient to withstand downhole closure stresses exceeding 7,500 psi.

In some embodiments, measuring the crush strength of the micromesh proppant 110 may include measuring the particle size of a sample of the micromesh proppant 110, crushing the sample at 15,000 psi under normal API crush conditions, and re-measuring the particle size of the sample. The increase in the amount of material that is less than a particular mesh size (e.g., as a percentage of the original amount) is determined as the crush strength. For example, for a particle size of 635 mesh, the sample is crushed at 15,000 psi under normal API crush conditions, and the sample us re-measured to determine the increase in the amount of material that is less than 635 mesh. In particular example, the amount of material that is less than 635 mesh may increase by 2.6% wt %. In this particular, example, the 15,000 psi crush strength of that micromesh proppant sample may be determined to be 2.6%.

In embodiments, the micromesh proppant 110 may be an angular abrasive proppant made of substantially or entirely angular sintered particles of a material selected from bauxite, clay-minerals, such as kaolins or mixtures thereof, with particle sizes varying from 150 mesh to 400 mesh, or from 175 mesh to 300 mesh. In embodiments, the micromesh proppant 110 may have a substantial absence of non-angular particles (e.g., spherical particles) and/or particles lying outside the 150 mesh to 400 mesh size range.

In embodiments, the micromesh proppant 110 may be formed from ceramic particles that are crushed, ground, pulverized, or milled. In some embodiments, the micromesh particles of the micromesh proppant 110 may have an angular surface having a plurality of protrusions including ridges, peaks, and the like. In some embodiments, the micromesh particles of the micromesh proppant 110 may be formed from any suitable alumina-containing raw material. The alumina-containing raw material may include, without limitation, bauxite, kaolin or kaolinite, slag, fly ash, civil work sand, fritted rock from naturally burnt coal formations, burnt rock waste and the like, ground up concrete from road repair activities, etc. In some embodiments, the micromesh proppant 110 may be obtained from any suitable bauxite material and may vary widely according to the region from which it originates, in addition to clay-minerals, kaolins for example, or mixtures thereof with raw bauxite in any proportions.

In embodiments, the micromesh proppant particles of the micromesh proppant 110 may be made by introducing ceramic raw material feed, or alumina-containing raw material, to a calciner and may be initially calcined in the calciner at temperatures and times sufficiently high to remove any organic material and to substantially remove water of hydration to provide calcined ceramic raw material.

In embodiments, the calcined ceramic raw material may be added in a predetermined ratio to a grinder, such as a ball mill, to provide a dry homogeneous particulate mixture. The dry homogeneous particulate mixture may have an average particle size of less than about 15 microns, less than about 10 microns, less than about 5 microns, or between about 3 microns and 0.5 microns.

In embodiments, a binder may be added at any location prior to, on, or after, the calciner and/or the grinder and prior to any pelletizing step. In one or more embodiments, the binder material may be introduced to the grinder in dry form and subjected to grinding along with the calcined ceramic raw material. In one or more exemplary embodiments, the binder material may be mixed or blended with the calcined ceramic raw material before entering the grinder. In one or more exemplary embodiments, the binder material may be supplied directly to the grinder.

In embodiments, the dry homogeneous particulate mixture provided by the grinder may be introduced to a separator that may screen out or remove binder particles having a size of about 50 microns or greater. These large and separated binder particles may be recycled to the grinder for regrinding into smaller particles. The remaining dry homogeneous particulate mixture having an average particle size of less than about 15 microns may be introduced to a pelletizing mixer to provide pellets having any suitable size.

The pelletizing mixer may be provided with a horizontal or inclined circular table, which may be made to rotate at a speed of from about 10 to about 60 revolutions per minute (rpm), and may be provided with a rotatable impacting impeller, which may be made to rotate at a tip speed of from about 5 to about 50 meters per second. The direction of rotation of the table may be opposite that of the impeller, causing material added to the mixer to flow over itself in countercurrent manner. The central axis of the impacting impeller may be located within the mixer at a position off center from the central axis of the rotatable table. The table may be in a horizontal or inclined position, wherein the incline, if any, can be between 0 and 35 degrees from the horizontal.

While the mixture is stirred, a suitable amount of water may be added to cause formation of composite, spherical pellets from the ceramic powder mixture. The total quantity of water sufficient to cause essentially spherical pellets to form may be from about 17 to about 20 wt % of the calcined ceramic raw material. The total mixing time may be from about 2 to about 6 minutes.

After the calcined ceramic raw material is added to the mixer, the table may be rotated at from about 10 to about 60 rpm or from about 20 to about 40 rpm, and the impacting impeller may be rotated to obtain a tip speed of from about 25 to about 50 or from about 25 to about 35, meters per second, and sufficient water may be added to cause essentially spherical pellets of the desired size to form. In embodiments, the impeller may be initially rotated at from about 5 to about 20 meters per second during addition of one-half of the sufficient water and subsequently rotated at the higher tip speed of 25 to about 50 meters per second during the addition of the balance of the water. The intense mixing action may quickly disperse the water throughout the particles.

The resulting pellets may be dried at a temperature of between about 100° C. (212° F.) and about 300° C. (572° F.) until less than 3 percent or less than 1 percent moisture remains in the pellets. For example, the drying temperature can be between about 175° C. (347° F.) and 275° C. (527° F.), and the drying time can be between about 30 and about 60 minutes.

The dried pellets may then be fed to a kiln at a sintering temperature for a period sufficient to enable recovery of the ceramic proppant particles. The specific time and temperature to be employed may be dependent on the starting ingredients and may be determined empirically according to the results of physical testing of ceramic particles after firing. The firing step may be carried out to sinter the composite pellets; generally, temperatures of between about 1,250° C. and about 1,550° C. for about 4 to about 20 minutes or from about 1,400° C. to about 1,515° C. for about 4 to about 8 minutes.

The micromesh proppant 110 may offer advantages such as the ability to travel deep into microfractures, potentially improving conductivity and well productivity. However, as noted above, the fine particle size of the proppant particles of the micromesh proppant 110 may generate dust during handling, which may lead to material loss, health hazards, and logistical complications.

Figure 2:
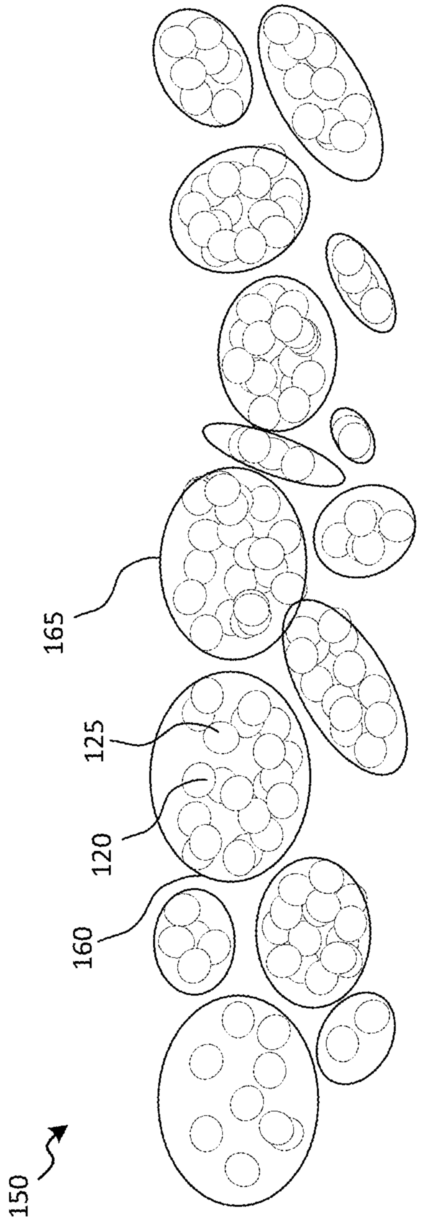
FIG. 2 shows the exemplary micromesh proppant in an aggregated structural state configured in accordance with embodiments of the present disclosure.

FIG. 2 shows the exemplary micromesh proppant 110 in an aggregated structural state 150 configured in accordance with embodiments of the present disclosure. As shown in FIG. 2, aggregated structural state proppant 150 represents the micromesh proppant 110 once it has been transitioned into the aggregated structural state (e.g., temporarily aggregated into larger structures to form the aggregated structural state proppant 150). In embodiments, the aggregated structural state proppant 150 may include a plurality of proppant super-particles, such as a proppant super-particle 160 and a proppant super-particle 165. In embodiments, the shape and/or size of the proppant super-particles may vary.

In embodiments, super-particles may be formed by binding together two or more proppant particles of the micromesh proppant 110. For example, the proppant super-particle 160 may be formed by binding together a plurality of proppant particles that includes proppant particle 120 and proppant particle 125 of the micromesh proppant 110. The super-particles of the aggregated structural state proppant 150 (e.g., the temporary aggregated structural state) may represent larger, cohesive aggregates of the smaller proppant particles of the micromesh proppant 110 that have a reduced tendency to form dust while maintaining adequate mechanical integrity for transportation and handling.

In some embodiments, the proppant super-particles of the aggregated structural state proppant 150 may have a size ranging from about 20 mesh to about 70 mesh. The proppant super-particles 160, 165 may have diameters ranging from about 0.2 mm to about 1.0 mm, depending on specific application requirements. In embodiments, the proppant super-particles of the aggregated structural state proppant 150 may have sizes ranging from about 10 mesh to about 100 mesh, or diameters from about 0.15 mm to about 2.0 mm. For some particular applications, larger super-particles with sizes up to about 8 mesh (approximately 2.36 mm) may be utilized. Conversely, for applications requiring finer particles, super-particles as small as about 325 mesh may be used. The size distribution of the super-particles may be configured to optimize handling, transportation, and deployment characteristics for specific well conditions and fracturing operations.

In some embodiments, the super-particles of the aggregated structural state proppant 150 may have a relatively uniform shape, such as substantially spherical or ellipsoidal form. This uniformity in shape may arise from a particular pelletizing technique used (e.g., spray drying or specialized agglomeration processes) to generate consistently round aggregates. Spherical or near-spherical shapes for the super-particles may offer the advantages of more predictable flow characteristics during pneumatic transport, reductio in the likelihood of bridging within conduits, and may help achieve a consistent breakdown profile when transitioning back to the micromesh structural state. Uniform shapes may also facilitate more accurate metering and mixing when blending the super-particles with fracturing fluids, which may lead to more precise proppant placement within fractures.

In some embodiments, the shape of the super-particles of the aggregated structural state proppant 150 may vary from particle to particle. This may result from the particular agglomeration techniques (e.g., tumbling, drum pelletization, etc.) used to generate the super-particles and which may yield random or irregular shapes. Irregularly shaped super-particles may exhibit different handling characteristics, including slightly increased mechanical interlocking, which may help maintain structural integrity under certain transport conditions. Irregularly shaped super-particles may also affect the way the super-particles break apart when the aggregated structural state proppant 150 is transitioned back to the micromesh structural state, as varying surface geometries of the super-particles may lead to differential rates of fluid penetration (e.g., water or breaking agent) and/or binding agent dissolution. Additionally, irregular shapes may create pockets or channels that may expedite fluid infiltration once the proppant is submerged, expediting the release of the underlying fine micromesh particles. Such shape heterogeneity may be intentionally configured as a natural byproduct of the particular pelletization process used, depending on specific performance goals and operational constraints.

In embodiments, and as will be described in more detail herein, the formation of the proppant super-particles (e.g., the transition of the micromesh proppant 110 into the aggregated structural state proppant 150) may include mixing the micromesh proppant 110 with a binding agent to generate the super-particles. This mixing process may occur in an aggregation device. In some embodiments, the aggregation device may include a high-intensity mixer, a ball mill, and/or any other suitable device for mixing the sintered proppant particles with the binding agent. In other embodiments, the aggregation device may be a drum pelletizer. The aggregation device may transition the micromesh proppant 110 into the aggregated structural state proppant 150 by forming super-particles from the proppant-binding agent mixture.

The properties of the proppant super-particles may be configured by varying factors such as moisture content, mixing speed, binding agent concentration, binding agent cure time, bonder to proppant ratio, etc. These configurations may yield proppant super-particles (e.g., proppant super-particles 160 and 165) that may be stable for handling and transportation, yet capable of disintegrating in a controlled manner when exposed to a specific breaking trigger.

In embodiments, the binding agent used to generate the super-particles may be configured to bind two or more proppant particles together to form a super-particles. In embodiments, the binding agent may be configured with sufficient mechanical strength to hold the proppant super-particles together during transportation and handling, yet be configured to break down under in a controlled manner when exposed to a specific breaking trigger. In embodiments, the configuration or selection of the binding agent may be driven by factors such as transport environment, downhole fluid chemistry, temperature profile, desired dissolution or degradation rate, etc. Additionally, the binding agent may be formulated to optimize the trade-off between mechanical strength (e.g., to reduce dust formation and material losses) and the ability to disintegrate in a timely manner.

In some embodiments, the binding agent may be a water-soluble polymer, such as starch-based binders (e.g., corn starch or tapioca starch) or cellulose derivatives (e.g., carboxymethyl cellulose or hydroxyethyl cellulose). Polyvinyl alcohol (PVA), polyacrylamides, lignin sulfonate. and/or other water-dispersible polymers may also be used as suitable water-soluble binding agents. These polymers may be configured to dissolve or disperse upon direct contact with water over a particular duration, facilitating the transition of the aggregated structural state proppant 150 back into the micromesh structural state and the release of the underlying micromesh proppant particles.

In some embodiments, the binding agent may be temperature-sensitive, including paraffin or wax-based binders that melt at downhole temperatures, or thermoplastic resins that soften or decompose in the higher temperatures encountered in the wellbore. In some embodiments, the temperature-sensitive binding agent may be configured to break down in response to a particular temperature applied to the aggregated structural state proppant 150.

In some embodiments, the binding agent may include a pH-sensitive binder, such as cross-linked polymer networks configured to dissolve or swell when exposed to specific pH values. Polymers with acid-labile or base-labile bonds may also be suitable candidates, enabling precise control over the dissolution profile by adjusting the pH of the fracturing fluid. In still some embodiments, the binding agent may be chemically or enzymatically degradable, such as polylactic acid (PLA) or other biodegradable polymers. Alginates or chitosan that degrade upon exposure to particular ions or enzymes may also be used when a gradual breakdown is desired based on operational requirements.

In embodiments, the proppant super-particles of the aggregated structural state proppant 150 may be configured to break down and disintegrate in response to a breaking trigger, in which case the micromesh proppant 110 transitions back to the micromesh structure state, ensuring a controlled release of the underlying micromesh proppant particles.

In embodiments, water dissolution may be a primary trigger for water-soluble binders, in which case hydration and shear forces from the fracturing fluid may degrade the binder matrix and may transition the micromesh proppant 110 transitions back to the micromesh structure state.

In some embodiments, elevated temperatures (e.g., elevated downhole temperatures or elevated temperatures applied to the aggregated structural state proppant 150) may melt the dinging agent (e.g., waxes or thermoplastic resins), which may transition the micromesh proppant 110 transitions back to the micromesh structure state. In some embodiments, fluids with specific pH may disrupt polymer cross-links in pH-sensitive binding agents to break down the super-particles and transition the micromesh proppant 110 transitions back to the micromesh structure state.

In some embodiments, the binding agent may be electrically or pressure-responsive, weakening or cleaving upon the passage of an electric current or when subjected to specific pressures. Electrically responsive binding agents, for example, may degrade at a controlled rate based on an applied voltage. In some embodiments, encapsulants configured to rupture at a predetermined pressure threshold may facilitate rapid breakdown (e.g., upon application of the pressure and/or once the proppant super-particles encounter downhole stress conditions). Mechanical forces may also be used a breaking mechanism, for example, by milling or shearing the super-particles immediately prior to injection.

In some embodiments, a breaking agent may be added to the aggregated structural state proppant 150 to degrade the binding holding the super-particles together and release the underlying proppant particles transitioning the micromesh proppant 110 transitions back to the micromesh structure state. In this manner, the binding agent used to form the super-particles may be configured with a high mechanical strength, as breaking of the super-particles may be done with the breaking agent ensuring that the super-particles remain bound during handling and transportation but still be easily dissolved or disintegrated when exposed to the breaking agent for use downhole. In embodiments, the breaking agent may include an oxidizing chemical or enzyme.

In embodiments, the configuration of the proppant super-particles of the aggregated structural state proppant 150 may include balancing dust-free transport against reliable disintegration for use downhole in the wellbore. A stronger binding agent may require a more aggressive or specialized breaking mechanism or agent but may offer superior dust control during transit and handling. Conversely, a weaker binding agent may dissolve with little intervention, but may require more careful handling to prevent premature breakup of the super-particles during handling.

By way of example, corn starch (e.g., a lightly crosslinked binding agent) may form stable super-particles. An α-amylase enzyme in a blender or fracturing fluid may then be used to selectively breaks down the starch to break apart the super-particles. In another example, low-melting paraffin or synthetic wax may be used as the biding agent to form the super-particles. In this example, temperatures above about 60° C. may melt the wax and disintegrate the super-particles. In other embodiments, polyvinyl alcohol (PVA) or polyethylene oxide with crosslinkers may be used along with an oxidizing or radical-forming breaker that cleaves polymer chains in a predictable manner. Acrylic-based polymers stable at neutral pH but dissolving in mildly acidic fluids may also be used, leveraging the pH conditions often present in fracturing operations. For purely mechanical approaches, a loosely crosslinked binder may allow an on-site shear device to break the super-particles just before pumping, ensuring the micromesh proppant reverts to its fine particle size at a precisely controlled stage.

Ultimately, the use of multiple and/or various binding agent types and breaking mechanisms provides significant flexibility for operators. By tailoring the binding agent and breaking mechanism to the unique and specific requirements of a given well, the improved micromesh proppant composition of embodiment may substantially reduce dust-related health and efficiency issues, streamline logistics, and still deliver the performance benefits of ultra-fine micromesh proppants for fracture conductivity.

Figure 3A:
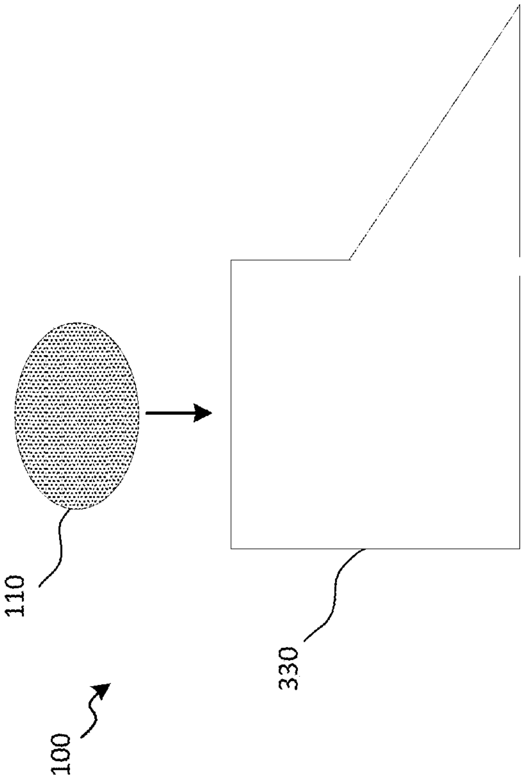
FIGS. 3A-3C illustrate a system configured to transition a micromesh proppant from a micromesh structural state to an aggregated structural state by forming super-particles from the micromesh proppant particles of the micromesh proppant in accordance with embodiments of the present disclosure.
Figure 3B:
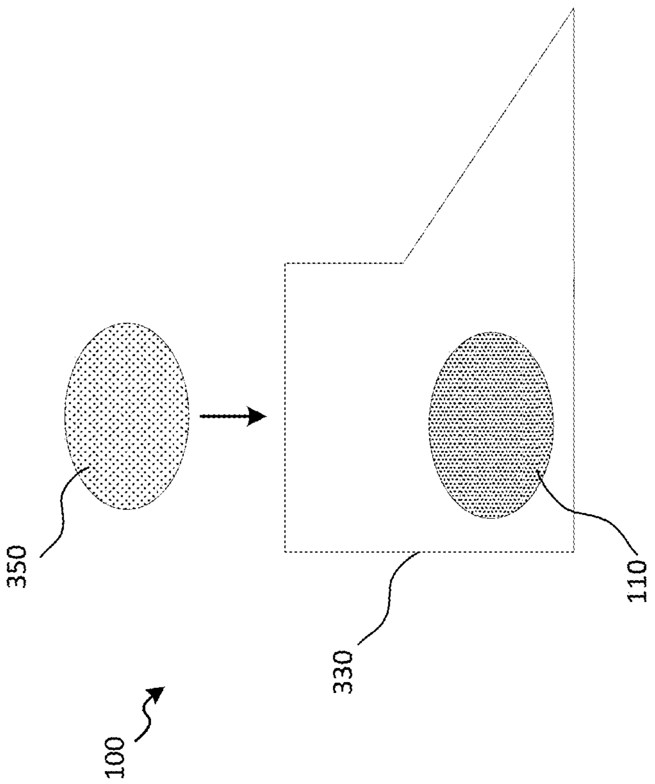
Figure 3C:
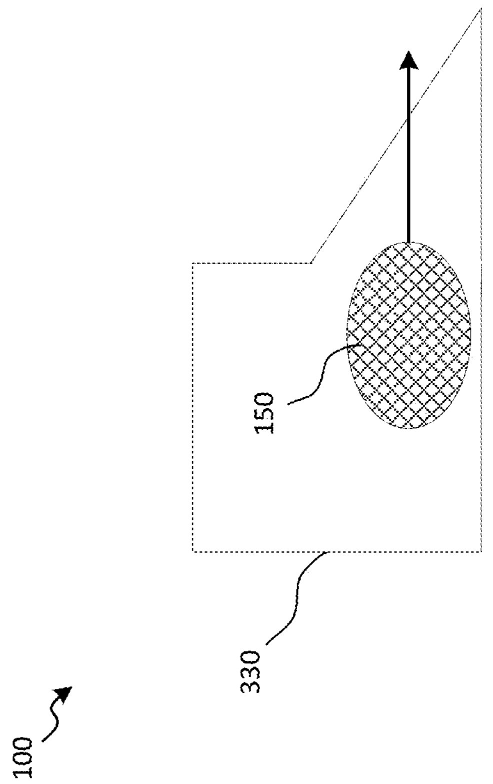
Figure 5:
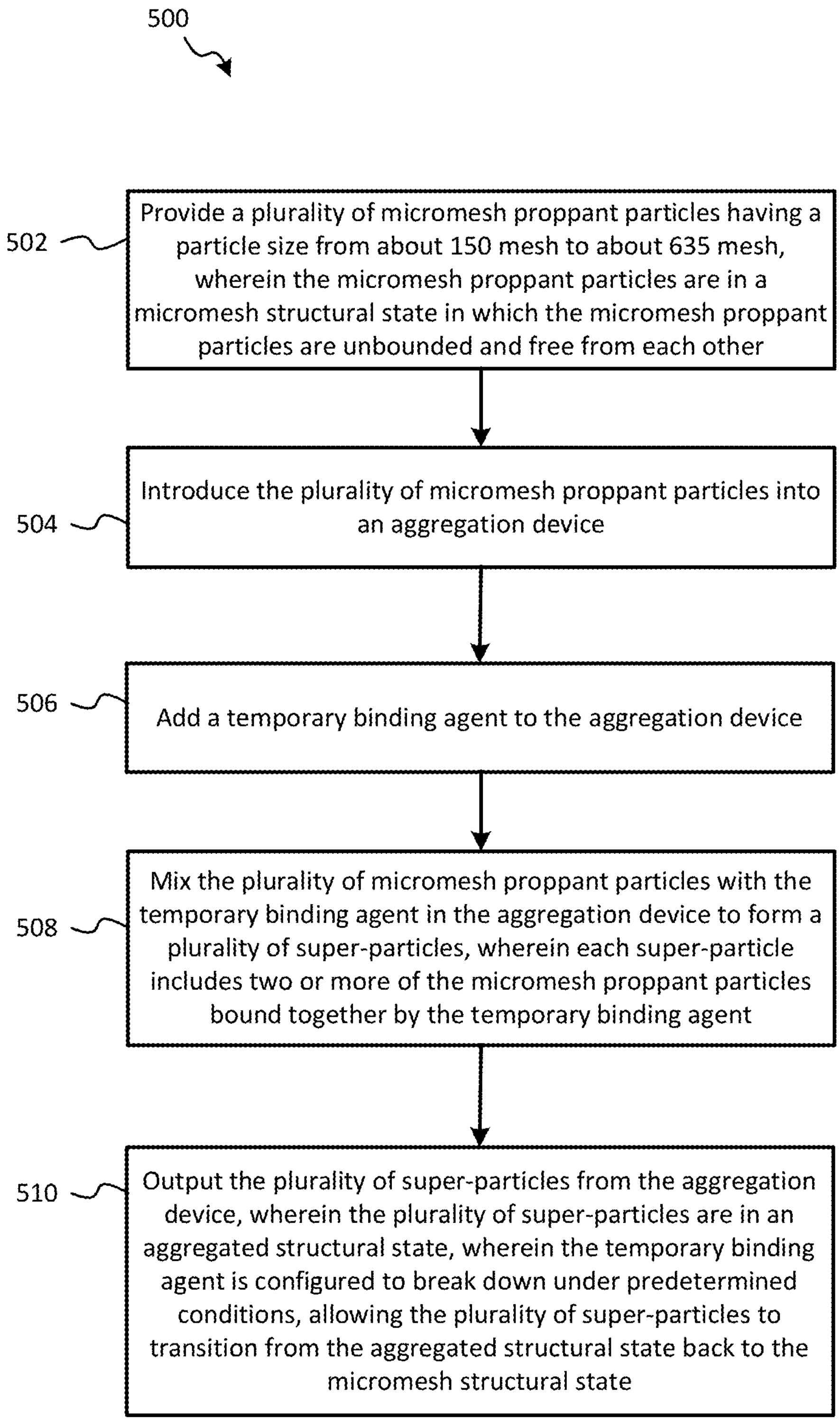
FIG. 5 shows a high-level flow diagram of operations for transitioning a micromesh proppant from a micromesh structural state to an aggregated structural state by forming super-particles from the micromesh proppant particles of the micromesh proppant in accordance with embodiments of the present disclosure.

Operations for transitioning a micromesh proppant from a micromesh structural state to an aggregated structural state by forming super-particles from the micromesh proppant particles of the micromesh proppant for improved handling will now be discussed with reference to FIGS. 5 and 3A-3C. FIG. 5 shows a high-level flow diagram 500 of operations for transitioning a micromesh proppant from a micromesh structural state to an aggregated structural state by forming super-particles from the micromesh proppant particles of the micromesh proppant in accordance with embodiments of the present disclosure. FIGS. 3A-3C illustrate a system 100 configured to transition a micromesh proppant from a micromesh structural state to an aggregated structural state by forming super-particles from the micromesh proppant particles of the micromesh proppant in accordance with embodiments of the present disclosure.

At block 502, a plurality of micromesh proppant particles having a particle size from about 150 mesh to about 635 mesh is provided. In embodiments, the micromesh proppant particles may be in a micromesh structural state in which the micromesh proppant particles are unbounded and free from each other. At block 504, the plurality of micromesh proppant particles is introduced into an aggregation device.

For example, as shown in FIG. 3A, system 100 may include an aggregation device 330 configured to receive the micromesh proppant 110. In embodiments, micromesh proppant 110 may include a plurality of micromesh proppant particles having a particle size from about 150 mesh to about 635 mesh.

In embodiments, prior to the introduction of the micromesh proppant 110 into the aggregation device 330, the micromesh proppant 110 may have undergone a sequence of manufacturing steps (such as forming, pelletizing, drying, and sintering as described herein) to achieve its fine mesh size and strong mechanical properties. At this stage, the micromesh proppant 110 may be a free-flowing powder that may be easy to transport in sealed containers but prone to dust formation if handled in open-air environments. The ultra-fine properties of the micromesh proppant 110 may also lend superior performance in microfractures but may present logistical challenges as described herein.

At block 506, a temporary binding agent is added to the aggregation device. For example, as shown in FIG. 3B, binding agent 350 may be added to the aggregation device 330. In embodiments, adding the binding agent 350 to the aggregation device 330 may form a proppant-binder mixture including the micromesh proppant 110 and the binding agent 330.

In embodiments, the binding agent 350 may be introduced into the aggregation device 330 in a measured quantity, ensuring that the correct ratio of binder to proppant is maintained for consistent super-particle formation. As described with reference to FIG. 2 (and/or other relevant FIGS.), the binding agent 350 may be configured or selected from a variety of chemistries, including water-soluble polymers, temperature-sensitive materials, pH-reactive compounds, etc. In some embodiments, the binding agent 350 may be delivered as a liquid solution, while in others, may be added in powdered or granular form, based on solubility and desired mixing characteristics.

At block 508, the plurality of micromesh proppant particles is mixed with the temporary binding agent in the aggregation device to form a plurality of super-particles. In embodiments, each super-particle includes two or more of the micromesh proppant particles bound together by the temporary binding agent. For example, as shown in FIG. 3C, the micromesh proppant 110 is mixed with the binding agent 350 to form the aggregated structural state proppant 150.

In embodiments, the aggregation device 330 may include a high-intensity mixer configured to apply mechanical forces to the proppant-binder mixture. In some embodiments, the aggregation device 330 may include a drum pelletizer, a ball mill, a fluid bed, spray driers, and/or other suitable device configured to combine the proppant particles and the binding agent 350. Such devices may vary in configuration, from continuous-flow pelletizing systems to batch mixers, each method offering distinct benefits in terms of throughput, control over particle size distribution, final pellet integrity, and or quality of the mixing. The aggregation equipment configuration may also depend on factors such as the viscosity of the binder, the fragility of the micromesh particles, the desired final super-particle size, etc.

As noted above, once inside the aggregation device 330, the micromesh proppant 110 is mixed with the binding agent 350 to cause the individual proppant particles of the micromesh proppant 110 to bind to each other to form super-particles of two or more proppant particles. In embodiments, the size of the super-particles may range from about 4 mesh to about 140 mesh. In some embodiments, the size of the super-particles be below 140 mesh. It is noted that, in some embodiments, a particular amount of the micromesh proppant 110 may not be aggregated into a super particle and may remain as plain micromesh proppant along with the super-particles. The amount that remains as plain micromesh proppant may be variable and in some embodiments configurable, as an acceptable amount to balance the cost of production with the intended level of dust reduction.

Key parameters, such as moisture content, total mixing time, and binder concentration, may be monitored and adjusted to achieve uniform distribution of the binding agent 350 among the proppant particles of the micromesh proppant 110. Moisture may facilitate temporarily softening or dissolving certain binders, which may enhance the cohesiveness of the formed super-particles. Conversely, excessive moisture may hinder pelletization and/or may produce weak aggregates or super-particles.

In embodiments, the aggregation device 330 may be configured to control multiple process parameters related to the formation of proppant super-particles. These parameters may include mixing speed, temperature, humidity, residence time, etc. Proper control of these parameters may facilitate consistent pellet quality, optimal binder distribution, reliable super-particle strength for transportation, etc. For example, the aggregation device 330 may include adjustable baffles or mixing paddles to regulate the flow pattern, which may prevent dead zones where binder might accumulate or fail to coat the proppant particles evenly.

In some embodiments, the aggregation device 330 may operate at mixing speeds ranging from about 100 to about 2000 rpm, although different speeds outside this range may be used based on the specific operational requirements. The temperature within the aggregation device 330 may be maintained between about 20° C. and about 100° C., depending on the chosen binding agent 350, as certain binders may require warmer conditions to soften or initiate polymerization. In embodiments, the residence time of materials in the device may span anywhere from a few minutes, which may be sufficient for high-intensity mixing, to several hours for more gradual super-particle formation or curing. In some embodiments, such as for a wet process that includes a spray fluid bed or a spray drier, the temperature may be higher.

In some embodiments, the aggregation device 330 may include multiple stages or compartments to facilitate different phases of the aggregation process. An initial chamber may perform preliminary mixing and partial wetting of the proppant, while a subsequent chamber may focus on shaping or compacting the mixture into super-particles. A final stage may include gentle tumbling or a controlled heat source to dry or cure the binding agent 350.

In some embodiments, the aggregation device 330 may be equipped with sensors and control systems that may monitor and adjust parameters such as moisture content, particle size distribution, binder concentration, etc., in real time. For example, in-line particle size analyzers might provide feedback to adjust mixing speed or binder feed rates, ensuring consistent formation of the proppant super-particles. Automated or semi-automated control systems may reduce operator intervention, may improve batch-to-batch reproducibility, and/or may maintain a stable process environment that yields uniform, high-quality aggregated structural state proppant 150.

The mixing of the micromesh proppant 110 with the binding agent 350 may transform the micromesh proppant 110 into larger, cohesive proppant super-particles, transitioning the micromesh proppant 110 from the micromesh structural state into the aggregate structural state. In this aggregated structural state, numerous proppant super-particles are formed by the union of micromesh proppant 110 and binding agent 350. Although the super-particles are larger and more cohesive, they retain the underlying beneficial features of the micromesh proppant 110, including high strength and fine particle size once they eventually break down.

In some embodiments, the aggregated structural state proppant 150 may be dried to remove excess moisture and/or the binder may be cured to confer sufficient mechanical integrity on the proppant super-particles for shipping. This may include heating, extended mixing, chemical cross-linking, etc. depending on binder properties.

At block 510, the plurality of super-particles is output from the aggregation device. In embodiments, the plurality of super-particles is in an aggregated structural state, and the temporary binding agent is configured to break down under predetermined conditions, allowing the plurality of super-particles to transition from the aggregated structural state back to the micromesh structural state.

For example, as shown in FIG. 3C, the aggregated structural state proppant 150 may be output from the aggregating device 330. The aggregated structural state proppant 150 produced by the aggregation device 330 may exhibit significantly improved handling characteristics compared to the original micromesh proppant 110. Because of the larger overall particle size of the proppant super-particles, dust generation during transportation and on-site transfer is substantially reduced, which improves safety and operational efficiency. Once transitioned back to the micromesh structural state (e.g., by a breaking mechanism), the super-particles may revert to the fine micromesh proppant 110 state that may enable superior penetration into microfractures when deployed downhole. In this manner, the aggregated structural state proppant 150 operates as a transitional form, combining dust mitigation during handling with the ultimate ability to revert to ultra-fine particles when exposed to a breaking mechanism.

Figure 4A:
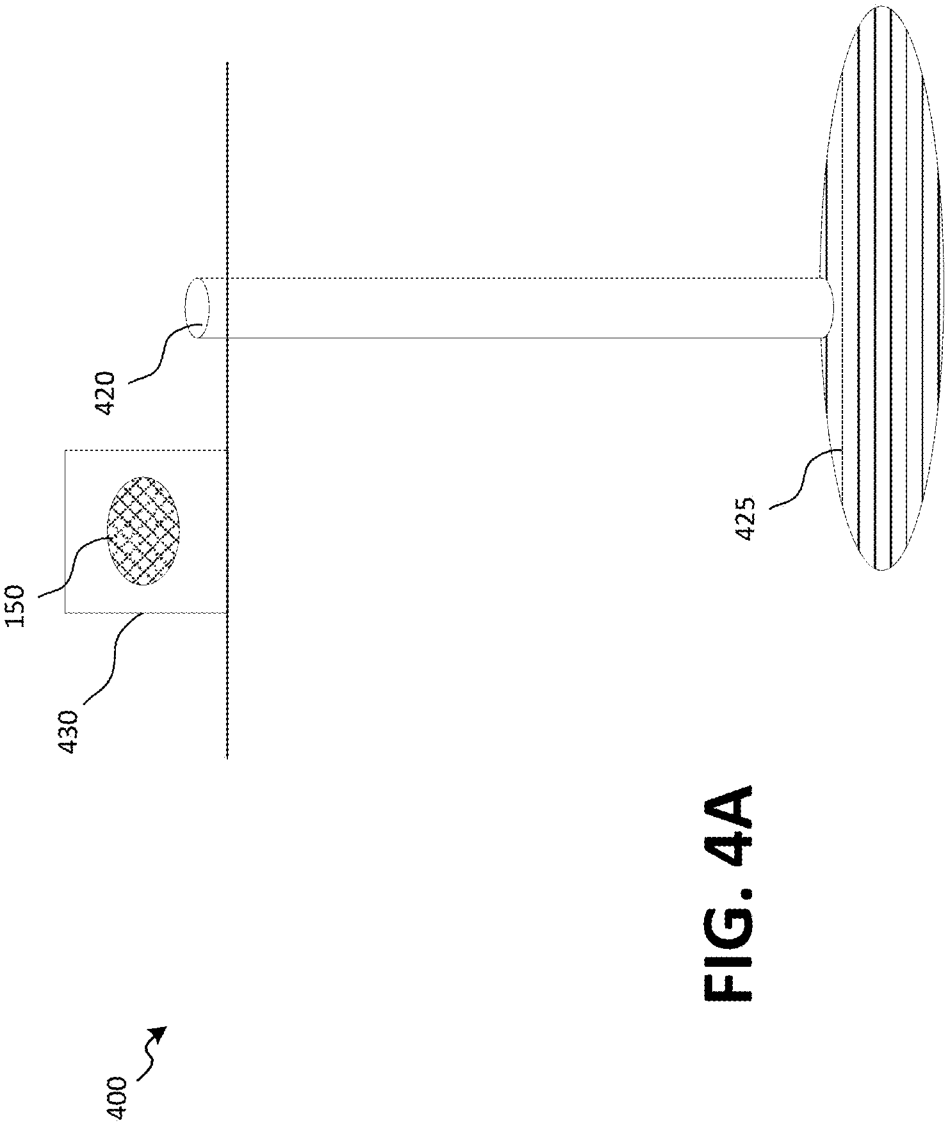
FIGS. 4A-4C illustrate a breaking system configured to receive the aggregated structural state proppant 150 and transform it back into its original micromesh structural state, freeing the individual micromesh proppant particles for deployment into fractures within a wellbore in accordance with embodiments of the present disclosure.
Figure 4B:
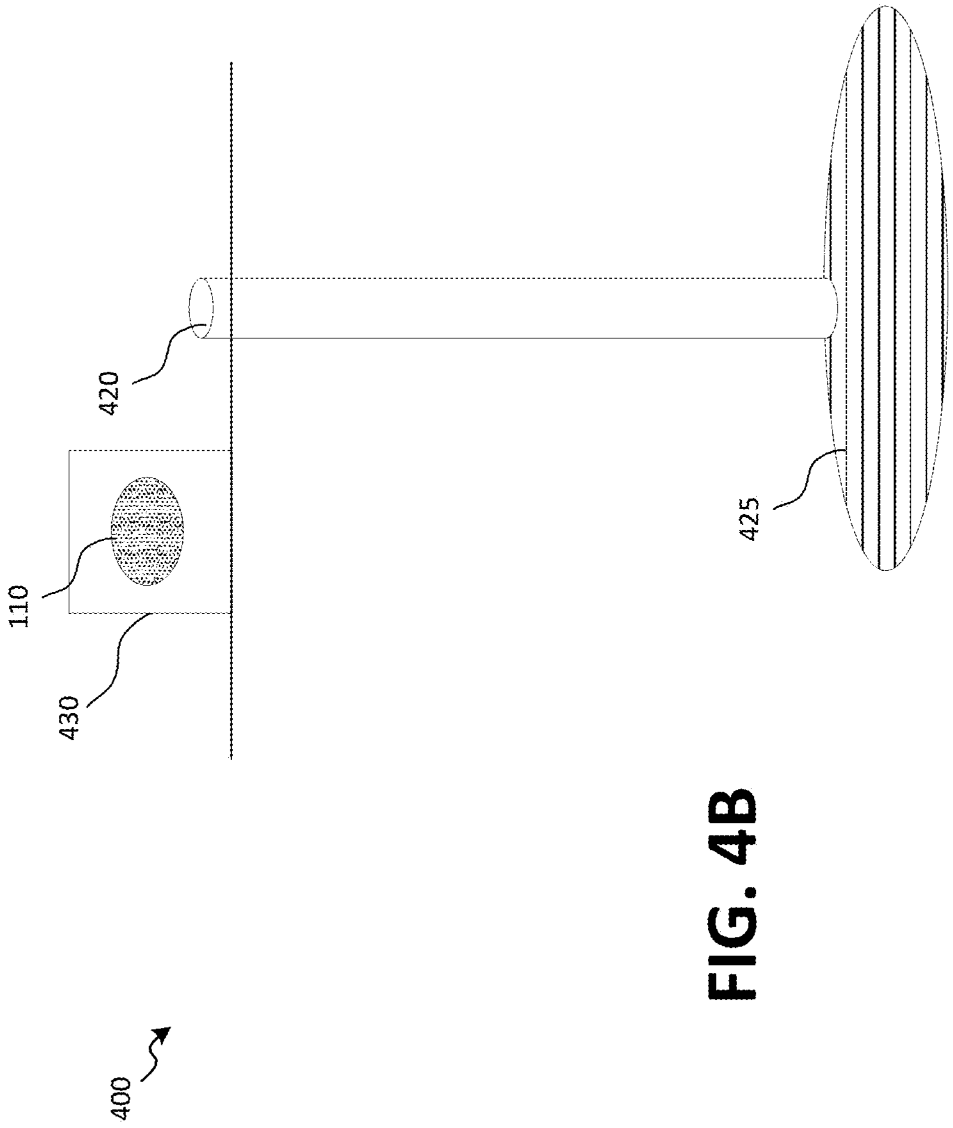
Figure 4C:
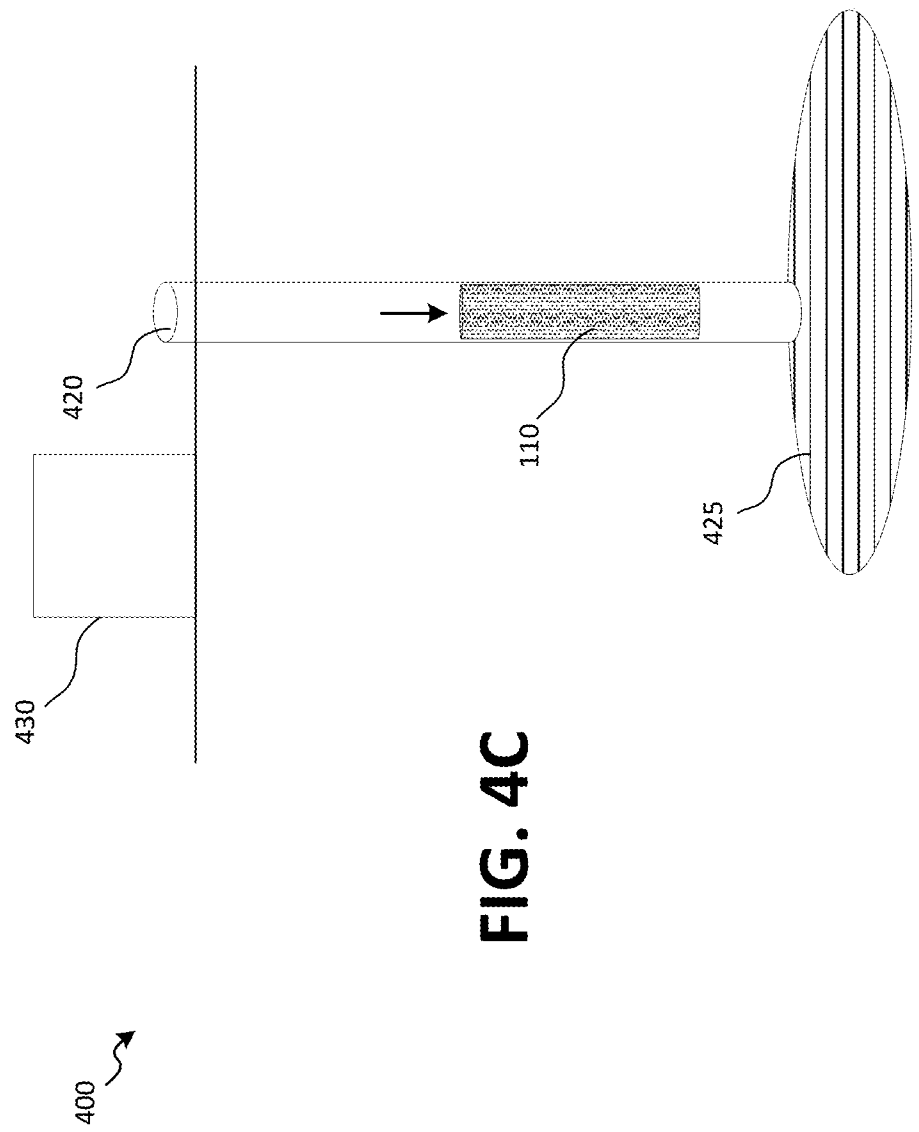
Figure 6:
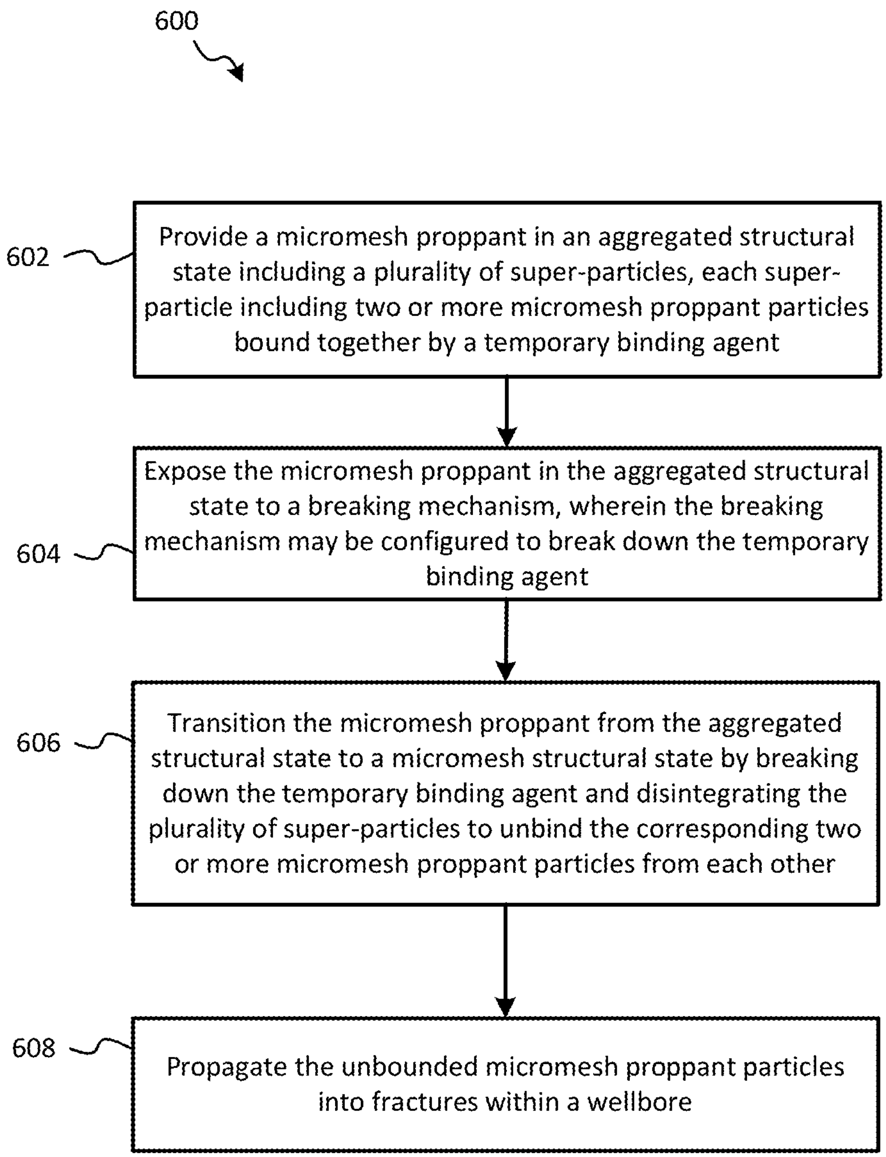
FIG. 6 illustrates a high-level flow diagram of a method for transitioning an aggregated structural state proppant to a micromesh structural state by breaking down a temporary binding agent and disintegrating the plurality of super-particles in accordance with embodiments of the present disclosure.

Operations for transitioning a micromesh proppant from an aggregated structural state back to the original micromesh structural state will now be discussed with reference to FIG. 6 and FIGS. 4A-4C. FIG. 6 illustrates a high-level flow diagram 600 of a method for transitioning an aggregated structural state proppant to a micromesh structural state by breaking down a temporary binding agent and disintegrating the plurality of super-particles in accordance with embodiments of the present disclosure. FIGS. 4A-4C illustrate a breaking system 400 configured to receive the aggregated structural state proppant 150 and transform it back into its original micromesh structural state, freeing the individual micromesh proppant particles for deployment into fractures within a wellbore.

At block 602, a micromesh proppant in an aggregated structural state is provided. In embodiments, the aggregated proppant includes a plurality of super-particles. Each super-particle may include two or more micromesh proppant particles bound together by a temporary binding agent. For example, as shown in FIG. 4A, the aggregated structural state proppant 150 may be transported to a work site (e.g., a well pad) in the aggregated structural state, which may represent a form optimized for handling and reduced dust generation. In embodiments, the super-particles in the aggregated structural state proppant 150 may range in size from about 70 mesh to about 20 mesh, while each micromesh proppant particle within those super-particles may remain in the finer 150 mesh to 635 mesh range.

At block 604, the aggregated structural state proppant 150 is exposed to a breaking mechanism. For example, as shown in FIG. 4A, the breaking system 400 may be disposed near the surface of a wellbore 420, where a breaking device 430 may facilitate or initiate the disintegration process of the super-particles of the aggregated structural state proppant 150.

In some embodiments, the breaking device 430 may be a mechanical device configured with rotating blades, impellers, and/or other shear-inducing components to physically break apart the super-particles to transition the aggregated structural state proppant 150 into the micromesh structural state.

In some embodiments, the device 430 may be configured to introduce or mix a chemical, thermal, electrical, and/or pressure-based breaking mechanism configured to degrade or dissolve, or initiate the degradation or dissolution of, the binding agent in the aggregated structural state proppant 150 in situ. The selection of breaking mechanism may be based on the type of binding agent employed. For example, if the binding agent is water-soluble, water or an aqueous solution may be introduced to the aggregated structural state proppant 150, whereas a temperature-sensitive binding agent may require heat application to melt or soften the binding agent.

In some embodiments, the binding agent in the aggregated structural state proppant 150 may be water soluble. In some embodiments, the process of placing the aggregated structural state proppant 150 in frac fluid may operate to initiate breakdown of the binding agent and the turbidity of the super-particles in the aggregated structural state proppant 150 as the super particles travel down to wellbore 420 to the frac network 425 may be sufficient to break the super-particles into the micromesh proppant 110.

At block 606, the micromesh proppant is transitioned from the aggregated structural state to a micromesh structural state. In embodiments, transitioning the micromesh proppant from the aggregated structural state to the micromesh structural state may include breaking down the temporary binding agent and disintegrating the super-particles into their constituent micromesh particles.

As shown in FIG. 4B, once the appropriate trigger is applied within the breaking device 430, the proppant super-particles may begin to lose their cohesion, freeing the original micromesh proppant particles of the micromesh proppant 110. In some embodiments, the breaking device 430 may apply mechanical shear forces, such as those generated by high-shear mixers or grinding elements, to overcome the binding forces between the micromesh particles. In some embodiments, a breaking agent (e.g., an acid, base, or oxidizing compound) may be introduced to shift the pH or chemically cleave the binding agent's polymer chains. Electrical or pressure triggers may also be used in some embodiments. For example, an electrical current may be used to weaken electro-sensitive bonds, and/or a pressure vessel may subject the aggregated structural state proppant 150's super-particles to abrupt pressure changes, which may cause structural failure of the binding matrix.

At block 608, the unbounded micromesh proppant particles may be propagated into fractures within a wellbore. For example, as shown in FIG. 4C, the restored micromesh proppant 110, now in its original fine-particle form, may move through the wellbore 420 and into the fracture networks 425. Because the binding agent is broken down, the individual micromesh particles of the micromesh proppant 110 retain their high strength and ultra-fine characteristics, allowing them to access microfractures effectively.

With reference back to FIG. 4A, it is noted that, in some embodiments, the breaking device 430 may be positioned at or near the surface, allowing for partial or complete breakdown of the aggregated structural state proppant 150 before the material is introduced to the wellbore 420. In some embodiments, this device 430 may integrate with existing hydraulic fracturing equipment, such as blenders and high-pressure pumps, to deliver a continuous flow of freshly disaggregated micromesh proppant 110. Alternatively, in other embodiments, the breaking device 430 may only initiate the breakdown, with the completion of binder dissolution occurring downhole due to wellbore conditions like elevated temperature, high pressure, or specific fluid chemistry.

In some embodiments, mechanical systems may be the primary mode of super-particle breakdown. The breaking device 430 may include rotating paddles, grinding plates, or similar implements that may apply targeted shear or impact forces. This technique may be particularly effective when the binding agent is relatively strong or when rapid disintegration maybe required to ensure that the micromesh proppant particles enter the wellbore in an unbound state.

In some embodiments, chemical or thermal processes may be used. For example, if the binding agent 350 is temperature-sensitive, the breaking device 430 may include heating elements that may raise the temperature above the binding agent 350's melting or degradation threshold, causing the super-particles to disintegrate. Alternatively, the breaking device 430 may introduce acids, bases, or oxidizers if the binding agent is pH-labile or chemically cleavable. A pH-sensitive binding agent may be dissolved by adjusting the fracturing fluid's acidity or alkalinity, while certain enzymatic breakers may be employed for starch-based binders. FIG. 4B highlights how the aggregated structural state proppant 150 transitions back into a micromesh structural state once these triggers are appropriately applied.

In some embodiments, the wellbore environment itself may serve as a final or additional stage in the breakdown process. As shown in FIG. 4C, the proppant super-particles may enter the wellbore 420 partially intact, relying on the downhole temperature, pressure, and fluid composition to degrade the binding agent further. This partial breakdown at the surface, coupled with final in-well disintegration, may provide operators with control over when and where the particles revert to their fine mesh state, which may offer advantages in proppant placement and fracture propagation.

In some embodiments, the proppant super-particles may enter the wellbore 420 fully intact, and may be configured to degrade the binding agent while the proppant super-particles travel down the wellbore 420. In this manner, the transition of the aggregated structural state proppant 150 may transition back into the micromesh proppant 110 during the passage through the wellbore 420 from the surface to the fracture network 425.

In embodiments, the breaking device 430 may include sensors or real-time monitoring to gauge the effectiveness of the breakdown process. Measurements of particle size distribution, fluid viscosity, or chemical composition at various stages may verify that super-particles are fully disintegrated. Such a feedback mechanism may allow operators to adjust parameters (e.g., mechanical intensity, chemical dosage, temperature, etc.) to optimize the release profile of the micromesh proppant 110, which may ensure a consistent and reliable transition to the micromesh structural state when required.

In some embodiments, the timing and rate of the breakdown process may be controlled to avoid premature disintegration, which may cause excessive dust generation or material loss at the surface. For example, the breaking device 430 may be configured to deliver gradually increasing shear or thermal input, allowing partial release of micromesh particles over time. This controlled release may ensure that the micromesh proppant 110 is in its ideal state (e.g., fine mesh size) precisely when it enters the fracture network 425, maximizing reservoir contact and minimizing handling difficulties on-site.

In some embodiments, the mechanical or chemical forces exerted against the aggregated structural state proppant 150 may be sufficient to overcome the binding agent 350, but not so aggressive as to crush or fracture the underlying micromesh proppant particles themselves. Calibrating the intensity, duration, and manner of applied forces (e.g., continuous versus pulsed mechanical action) may help ensure that the micromesh proppant particles remain structurally sound to withstand the high stresses of the fractures within the wellbore.

In embodiments, the breaking system 400 may be integrated into existing hydraulic fracturing or well-completion equipment. In some embodiments, the device 430 may be positioned directly upstream of high-pressure pumps or fracturing fluid blenders, eliminating the need for separate handling steps. This integrated approach streamlines logistics, as the aggregated structural state proppant 150 may be transported with minimal dust emission, then immediately broken down and introduced into the wellbore as micromesh proppant 110, combining operational efficiency with optimal downhole performance. By employing the described method and system, operators may realize the full benefits of micromesh proppant technology (e.g., deep fracture penetration and enhanced conductivity among others), while mitigating the usual handling drawbacks associated with ultra-fine particles.

Experiments and production runs have demonstrated the effectiveness of using a water-soluble starch binding agent to pelletize micromesh proppants into proppant super-particles. The pelletized proppant super-particles maintained structural integrity during transportation, handling at the well site, and pumping the super-particles down into the formation. Trials simulating pneumatic transport were performed with a marked reduction in dust comparted to transport of the micromesh proppant. This indicates improved handling characteristics compared to non-pelletized micromesh proppants.

When the pelletized proppant super-particles were subsequently immersed in a water-based fracturing fluid, rapid disintegration occurred. Disintegration rates of up to 90-95% were observed within minutes of immersion, with most particles reverting to their original fine state. A small portion of the pelletized proppant super-particles remained partially bound after initial immersion. However, these partially bound particles readily broke down when subjected to shear forces or after extended soak time in the fracturing fluid.

A series of trials were conducted to evaluate how pelletized micromesh proppants regained their original size distribution when subjected to water blending or mechanical agitation. Table 1 presents illustrative sieve data from these trials, showing approximate percentages of particles passing through specific mesh sizes.

TABLE 1

| | % Passing through Sieve | | | | | | | | |
|---|---|---|---|---|---|---|---|---|---|
| | <100M | <140M | <170M | <200M | <230M | <270M | <325M | <635m | % Pellets Reduced |
| Micromesh Proppant | 75.7 | 67.1 | 62.9 | 54.6 | 49.0 | 42.1 | 38.4 | 23.8 | N/A |
| Pellets Lab Mixed Aug. 31, 2023 | 33.8 | 30.3 | 28.7 | 24.3 | 20.6 | 17.6 | 15.6 | 6.0 | ~45% |
| Pellets Lab Blended Aug. 31, 2023 | 65.6 | 62.7 | 60.0 | 54.5 | 49.2 | 45.4 | 41.5 | 26.0 | ~87% |
| Pellets Lab Blended Oct. 13, 2023 | 72.2 | 61.2 | 57.4 | 46.4 | 37.0 | 33.7 | 31.6 | 26.3 | ~95% |

The data in Table 1 shows the percentage of particles passing through various mesh sizes for different proppant samples. The "Micromesh Proppant" row represents the original, non-pelletized proppant size distribution. The subsequent rows show the size distribution of pelletized proppants after different processing conditions.

Agglomerated pellets formed on Aug. 31, 2023 showed a reduction in the percentage of particles passing through each mesh size compared to the original micromesh proppant. This may indicate that a significant portion of the proppant remained in pelletized form, with approximately 45% of the pellets reduced to their original size.

Agglomerated pellets formed on Aug. 31, 2023 demonstrated a higher degree of breakdown, with percentages closer to the original micromesh proppant distribution. Approximately 87% of the pellets were reduced to their original size under these conditions.

Agglomerated pellets formed on Oct. 13, 2023 showed the highest degree of breakdown, with percentages very close to the original micromesh proppant distribution. In this case, approximately 95% of the pellets were reduced to their original size.

The varying dissolution times observed for pellets from different lab batches may suggest that binder selection and mixing conditions may be optimized to meet specific operational requirements. Factors such as binder type, concentration, and mixing parameters may be adjusted to achieve desired pellet integrity during transport and controlled breakdown characteristics in wellbore conditions.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A micromesh proppant composition, comprising:

a plurality of micromesh proppant particles having a particle size from about 140 mesh to about 635 mesh; and a temporary binding agent, wherein the micromesh proppant composition is configured to transition between:

a micromesh structural state in which micromesh proppant particles of the plurality of micromesh proppant particles are unbounded and free from each other; and an aggregated structural state in which the plurality of micromesh proppant particles is bound into super-particles, each super-particle comprising two or more of the micromesh proppant particles, wherein, in the aggregated structural state, the temporary binding agent binds micromesh particles of the plurality of micromesh particles into super-particles, and wherein the temporary binding agent is configured to break down under predetermined conditions, allowing the micromesh proppant composition to transition from the aggregated structural state to the micromesh structural state.

2. The micromesh proppant composition of claim 1, wherein the temporary binding agent comprises at least one of: a water-soluble polymer, a temperature-sensitive binder, a pH-sensitive binder, an electrically sensitive binder, a pressure-sensitive binder, or a chemically degradable binder.

3. The micromesh proppant composition of claim 2, wherein the temporary binding agent comprises a water-soluble polymer selected from the group consisting of starches, cellulose derivatives, polyvinyl alcohol, and lignin sulfonate.

4. The micromesh proppant composition of claim 1, wherein the super-particles have a size range from about 4 mesh to about 140 mesh.

5. The micromesh proppant composition of claim 1, wherein the predetermined conditions comprise at least one of: exposure to water, exposure to a specific temperature range, exposure to a specific pH range, exposure to an electrical current, exposure to a specific pressure range, or exposure to a chemical breaking agent.

6. The micromesh proppant composition of claim 1, further comprising a breaking agent configured to chemically cleave or dissolve the temporary binding agent.

7. The micromesh proppant composition of claim 6, wherein the breaking agent comprises an oxidizing agent or an enzyme.

8. The micromesh proppant composition of claim 1, wherein the super-particles are configured to disintegrate over a configurable period of time when exposed to wellbore conditions.

9. The micromesh proppant composition of claim 1, wherein the super-particles are configured to reduce dust generation during handling of the micromesh proppant composition compared to the micromesh structural state.

10. A method of transitioning a micromesh proppant from a micromesh structural state to an aggregated structural state, the method comprising:

providing a plurality of micromesh proppant particles having a particle size from about 150 mesh to about 635 mesh, wherein the micromesh proppant particles are in a micromesh structural state in which the micromesh proppant particles are unbounded and free from each other;

introducing the plurality of micromesh proppant particles into an aggregation device;

adding a temporary binding agent to the aggregation device;

mixing the plurality of micromesh proppant particles with the temporary binding agent in the aggregation device to form a plurality of super-particles, wherein each super-particle includes two or more of the micromesh proppant particles bound together by the temporary binding agent; and outputting the plurality of super-particles from the aggregation device, wherein the plurality of super-particles is in an aggregated structural state, wherein the temporary binding agent is configured to break down under predetermined conditions, allowing the plurality of super-particles to transition from the aggregated structural state back to the micromesh structural state.

11. The method of claim 10, wherein the temporary binding agent comprises at least one of: a water-soluble polymer, a temperature-sensitive binder, a pH-sensitive binder, an electrically sensitive binder, a pressure-sensitive binder, or a chemically degradable binder.

12. The method of claim 11, wherein the temporary binding agent comprises a water-soluble polymer selected from the group consisting of starches, cellulose derivatives, polyvinyl alcohol, and lignin sulfonate.

13. The method of claim 10, wherein the super-particles have a size range from about 4 mesh to about 140 mesh.

14. The method of claim 10, wherein the plurality of super-particles in the aggregated structural state is configured to reduce dust generation during handling of the plurality of super-particles compared to the micromesh proppant particles in the micromesh structural state.

15. The method of claim 10, further comprising:

introducing the plurality of super-particles into a wellbore, wherein the predetermined conditions comprise at least one of: exposure to water, exposure to a specific temperature range, exposure to a specific pH range, exposure to an electrical current, exposure to a specific pressure range, or exposure to a chemical breaking agent.

16. A method of transitioning an aggregated structural state proppant to a micromesh structural state, the method comprising:

providing a micromesh proppant composition in an aggregated structural state, the micromesh proppant composition including a plurality of micromesh proppant particles and a temporary binding agent, wherein the temporary binding agent binds the plurality of micromesh particles to form a plurality of super-particles, each super-particle including two or more micromesh proppant particles;

exposing the micromesh proppant composition in the aggregated structural state to a breaking mechanism, wherein the breaking mechanism is configured to break down the temporary binding agent;

transitioning the micromesh proppant composition from the aggregated structural state to a micromesh structural state by breaking down the temporary binding agent and disintegrating the plurality of super-particles to unbind the corresponding two or more micromesh proppant particles from each other; and propagating the unbounded micromesh proppant particles into fractures within a wellbore.

17. The method of claim 16, wherein exposing the micromesh proppant composition in the aggregated structural state to the breaking mechanism includes at least one of: exposure to water, exposure to a specific temperature range, exposure to a specific pH range, exposure to an electrical current, exposure to a specific pressure range, or exposure to a chemical breaking agent.

18. The method of claim 16, wherein the breaking mechanism includes a breaking agent configured to chemically cleave or dissolve the temporary binding agent.

19. The method of claim 18, wherein the breaking agent comprises an oxidizing agent or an enzyme.

20. The method of claim 16, wherein the micromesh proppant in the aggregated structural state is configured to reduce dust generation during handling of the micromesh proppant compared to the micromesh proppant in the micromesh structural state.

* * * * *